(12) United States Patent
Fang et al.

(10) Patent No.: US 9,819,573 B2
(45) Date of Patent: Nov. 14, 2017

(54) METHOD FOR SCALABLE COMPUTER NETWORK PARTITIONING

(71) Applicant: Microsoft Corporation, Redmond, WA (US)

(72) Inventors: Luyuan Fang, Holmdel, NJ (US); Jeff Cox, Fall City, WA (US); Nasser Elaawar, Seattle, WA (US); Darren Loher, Kirkland, WA (US); Edet Nkposong, Sammamish, WA (US); Gary Ratterree, Sammamish, WA (US); Fabio Chiussi, Holmdel, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 14/484,169

(22) Filed: Sep. 11, 2014

(65) Prior Publication Data

US 2016/0080245 A1 Mar. 17, 2016

(51) Int. Cl.
*H04L 12/28* (2006.01)
*H04L 12/715* (2013.01)
*H04L 12/741* (2013.01)

(52) U.S. Cl.
CPC ............ *H04L 45/04* (2013.01); *H04L 45/745* (2013.01)

(58) Field of Classification Search
CPC .............................. H04L 45/04; H04L 45/745
See application file for complete search history.

(56) References Cited

U.S. PATENT DOCUMENTS 6,078,590 A 6/2000 Farinacci et al.
6,088,356 A 7/2000 Hendel et al.
(Continued)

FOREIGN PATENT DOCUMENTS

CN 103248565 8/2013
EP 1460808 A2 9/2004
(Continued)

OTHER PUBLICATIONS

Faucheur, et al., "Multi-Protocol Label Switching (MPLS) Support of Differentiated Services", In Proceedings of RFC 3270, May 2002, 64 pages.
(Continued)

*Primary Examiner* — Gregory Sefcheck
*Assistant Examiner* — Jael Ulysse
(74) *Attorney, Agent, or Firm* — Liang IP, PLLC

(57) ABSTRACT

Various techniques for partitioning a computer network is disclosed herein. In certain embodiments, control plane functions (e.g., computation of network routes) and/or forwarding plane functions (e.g., routing, forwarding, switching) may be partitioned and performed individually on per domain basis based on (1) a network configuration of a particular domain (e.g., end points and/or lower-level domains in the particular domain); and (2) one or more higher-level domains connected to the particular domain in the hierarchy. Thus, a particular domain can manage various network operations of the domain without concerns regarding end points or network nodes in other domains of the hierarchy. Thus, network configuration and operation may be partitioned to reduce hardware costs and operational complexity even as the size of the overall computer networks increases.

20 Claims, 10 Drawing Sheets

(56) References Cited

U.S. PATENT DOCUMENTS

| | | | |
|---|---|---|---|
| 7,212,526 B2 | 5/2007 | Kanetake | |
| 7,613,796 B2 | 11/2009 | Harvey et al. | |
| 7,626,925 B1 | 12/2009 | Sivabalan | |
| 7,672,253 B2 | 3/2010 | Yang et al. | |
| 8,160,063 B2 | 4/2012 | Maltz et al. | |
| 8,385,341 B2 | 2/2013 | Kern | |
| 8,565,071 B2 | 10/2013 | He et al. | |
| 8,718,060 B2 | 5/2014 | Swallow | |
| 8,750,288 B2 | 6/2014 | Nakil et al. | |
| 2002/0150094 A1* | 10/2002 | Cheng | H04L 12/185 370/389 |
| 2003/0072270 A1* | 4/2003 | Guerin | H04L 45/04 370/254 |
| 2003/0162499 A1* | 8/2003 | Jonsson | H04L 45/04 370/351 |
| 2003/0217175 A1 | 11/2003 | Mathew et al. | |
| 2004/0047353 A1* | 3/2004 | Umayabashi | H04L 12/18 370/395.63 |
| 2006/0268682 A1* | 11/2006 | Vasseur | H04L 41/12 370/216 |
| 2007/0076732 A1 | 4/2007 | Kim | |
| 2007/0160039 A1* | 7/2007 | Xu | H04L 41/12 370/389 |
| 2008/0008104 A1* | 1/2008 | Previdi | H04L 12/66 370/255 |
| 2008/0049621 A1* | 2/2008 | McGuire | H04L 12/6418 370/236.2 |
| 2009/0303880 A1 | 12/2009 | Maltz et al. | |
| 2012/0180047 A1* | 7/2012 | Cardona | G06F 9/45558 718/1 |
| 2012/0213222 A1 | 8/2012 | Filsfils | |
| 2012/0218884 A1 | 8/2012 | Kini | |
| 2012/0327938 A1 | 12/2012 | Song | |
| 2013/0044763 A1* | 2/2013 | Koponen | H04L 12/66 370/401 |
| 2013/0088971 A1* | 4/2013 | Anantharam | H04L 49/10 370/236 |
| 2013/0170435 A1 | 7/2013 | Dinan | |
| 2013/0191477 A1 | 7/2013 | You et al. | |
| 2013/0204917 A1* | 8/2013 | Wang | G06F 9/52 709/201 |
| 2013/0242990 A1* | 9/2013 | Basso | H04L 12/18 370/390 |
| 2013/0286846 A1 | 10/2013 | Atlas et al. | |
| 2013/0322443 A1 | 12/2013 | Dunbar et al. | |
| 2013/0336315 A1 | 12/2013 | Guichard | |
| 2014/0177637 A1 | 6/2014 | Duncan et al. | |
| 2014/0185614 A1 | 7/2014 | Hunter et al. | |
| 2014/0198634 A1 | 7/2014 | Kumar | |
| 2014/0219281 A1* | 8/2014 | Awano | H04L 45/34 370/392 |
| 2014/0233569 A1 | 8/2014 | Yong et al. | |
| 2014/0369356 A1 | 12/2014 | Bryant | |
| 2014/0376409 A1* | 12/2014 | Lee | H04L 45/02 370/255 |
| 2015/0063360 A1* | 3/2015 | Thakkar | H04L 45/745 370/400 |

FOREIGN PATENT DOCUMENTS

| | | |
|---|---|---|
| EP | 2648382 | 10/2013 |
| WO | 0074305 A2 | 12/2000 |

OTHER PUBLICATIONS

Chen, et al., "Improving Large Graph Processing on Partitioned Graphs in the Cloud", In Proceedings of the Third ACM Symposium on Cloud Computing, Article No. 3, Oct. 14, 2012, 13 pages.

"International Search Report & Written Opinion Received for PCT Application No. PCT/US2015/048756", Mailed Date: Dec. 16, 2015, 11 Pages.

Beckhaus, et al., "LDP Downstream-on-Demand in Seamless MPLS", Published on: Jul. 4, 2011, Available at: http://133.40.3.100/id/draft-beckhaus-ldp-dod-00.html.

"Multi-Protocol Label Switching (MPLS) Conformance and Performance Testing", In White Paper IXIA, Jan. 2014, 32 pages.

International Search Report & Written Opinion Issued in PCT Application No. PCT/US2015/049878, dated Nov. 20, 2015, 12 pages.

Nagaraj, et al., "Hierarchy-aware Distributed Overlays in Data Centers using DC2", In Proceedings of the Fourth International Conference on Communication Systems and Networks, Jan. 3, 2012, 10 Pages.

Office Action issued in U.S. Appl. No. 14/488,018, dated Feb. 2, 2016, 20 pages.

Notice of Allowance issued in U.S. Appl. No. 14/488,018, dated Jul. 27, 2016, 5 pages.

"Karthik Nagaraj et al: ""Hierarchy-aware distributed overlays indata centers using DC2"", Communication Systems Andnetworks (COMSNETS), 2012 Fourth International Conference on, IEEE, Jan. 3, 2012 (Jan. 3, 2012), pp. 1-10,XP032115012, DOI: 10.1109/COMSNETS.2012.6151314ISBN: 978-1-4673-0296-8".

"Written Opinion Issued in PCT Application No. PCT/US2015/049878", dated Jul. 21, 2016, 7 Pages.

Yang, Xiaowei, "Lecture 15: DataCenter Network: Topology and Routing", Retrieved From <<https://www.cs.duke.edu/courses/fall10/cps296.2/lectures/16RoutingTopology.pdf>>, Nov. 18, 2010, 70 Pages.

Notice of Allowance issued in U.S. Appl. No. 14/488,018, dated Aug. 25, 2016, 5 pages.

"Second Written Opinion Issued in PCT Application No. PCT/US2015/048756", dated Sep. 12, 2016, 6 Pages.

"International Preliminary Report on Patentability Issued in PCT Application No. PCT/US2015/048756", dated Jan. 9, 2017, 7 Pages.

\* cited by examiner

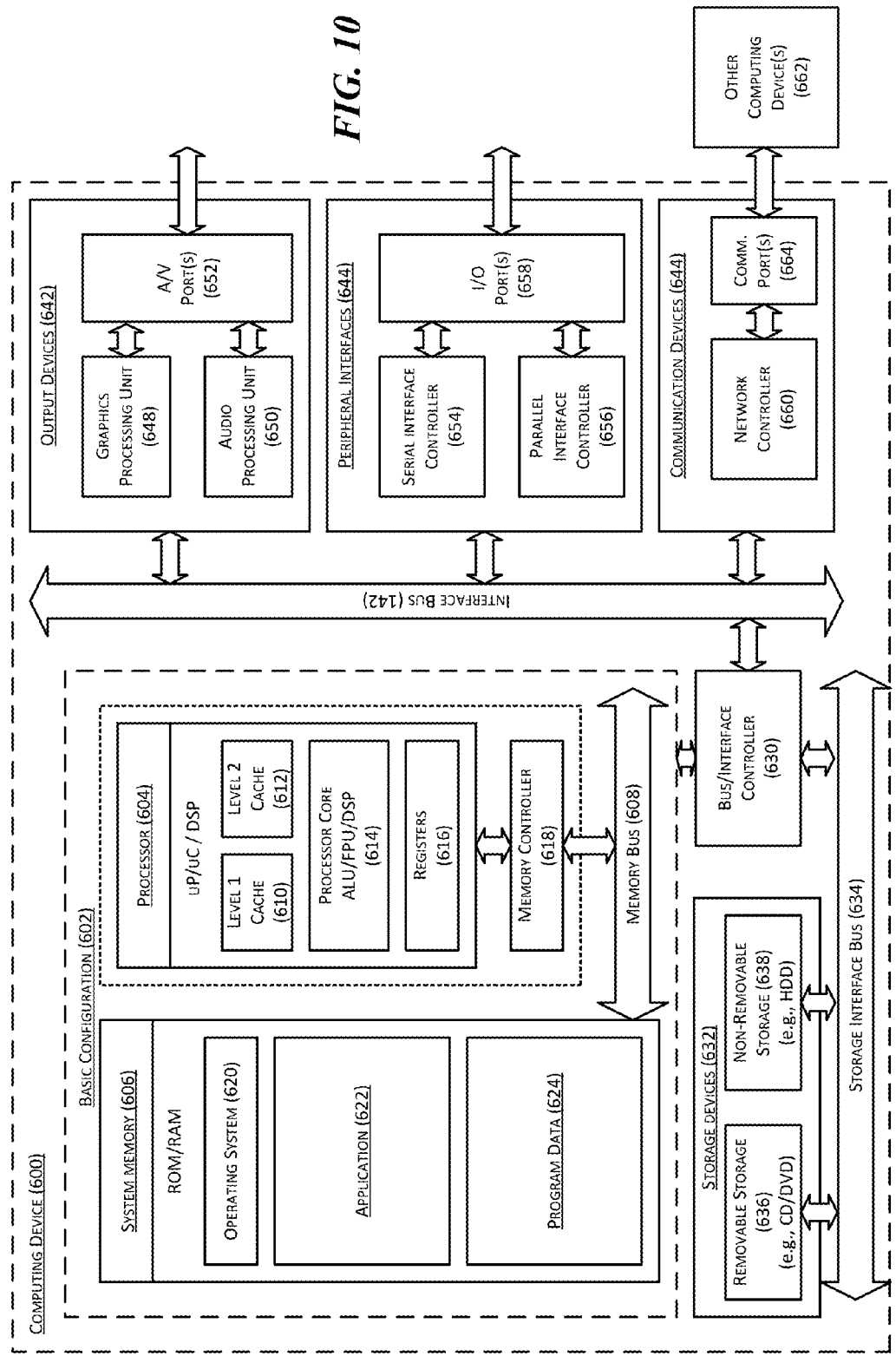

METHOD FOR SCALABLE COMPUTER NETWORK PARTITIONING

CROSS-REFERENCE TO RELATED APPLICATION(S)

This application is related to U.S. patent application Ser. No. 14/488,018, entitled "METHOD FOR END POINT IDENTIFICATION IN COMPUTER NETWORKS," filed Sep. 16, 2014, the disclosure of which is incorporated herein in its entirety.

BACKGROUND

Computer networks can have a large number of physical or virtual servers interconnected with one another by routers, switches, bridges, or other network nodes via wired or wireless network links. The network nodes can enable communications between the servers by exchanging messages via the network links in accordance with one or more network protocols.

One difficulty associated with designing and operating computer networks is scalability. As the number of servers increases, the amount of requisite resources as well as operational complexity increase. For example, modern routers typically carry a routing table in memory that specifies network routes to reach particular servers in a computer network. As the number of servers increases, so does the size of the routing table and the complexity of computing network routes for the routing table. Thus, both hardware costs and operational complexity of the routers can increase to unmanageable levels as the number of servers reaches millions or tens of millions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Scaling up computer networks to millions of servers, virtual machines, or other end points may be difficult based on existing network technology. As the number of end points increases, hardware costs and operational complexity may increase to unmanageable levels. For example, computing network routes between pairs of millions of end points may require considerable computing power, and may also result in routing tables that exceed memory capacities of routers. In other examples, network traffic management techniques (e.g., traffic engineering or load balancing) may be difficult to implement on millions or tens of millions of end points. For instance, computing network routes (or tunnels) for traffic engineering, allocating network bandwidth to traffic engineering tunnels, or other similar nondeterministic-polynomial complete ("NP-complete") problems may be difficult when the number of end points becomes large.

Several embodiments of the present technology may improve scalability of computer networks by partitioning computer networks into distinct physical or overlay domains interconnected with one another in a hardware or software defined hierarchy. Control plane functions (e.g., computation of network routes) and/or forwarding plane functions (e.g., routing, forwarding, switching) may be partitioned and performed individually on per domain basis based on (1) a network configuration of a particular domain (e.g., end points and/or lower-level domains in the particular domain); and (2) one or more higher-level domains connected to the particular domain in the hierarchy. Thus, the particular domain can manage various network operations of the domain without concerns regarding end points or network nodes in any other domains of the hierarchy. As a result, network configuration and operation may be partitioned to reduce hardware costs and operational complexity even as the size of the overall computer networks increases. Other embodiments of the present technology are directed to identifying end points in a computer network based on at least a portion of a physical location at which each of the end points are located.

BRIEF DESCRIPTION OF THE DRAWINGS

FIG. 10 is a computing device suitable for certain components of the computer network in FIG. 1A.

DETAILED DESCRIPTION

Figure 1A:
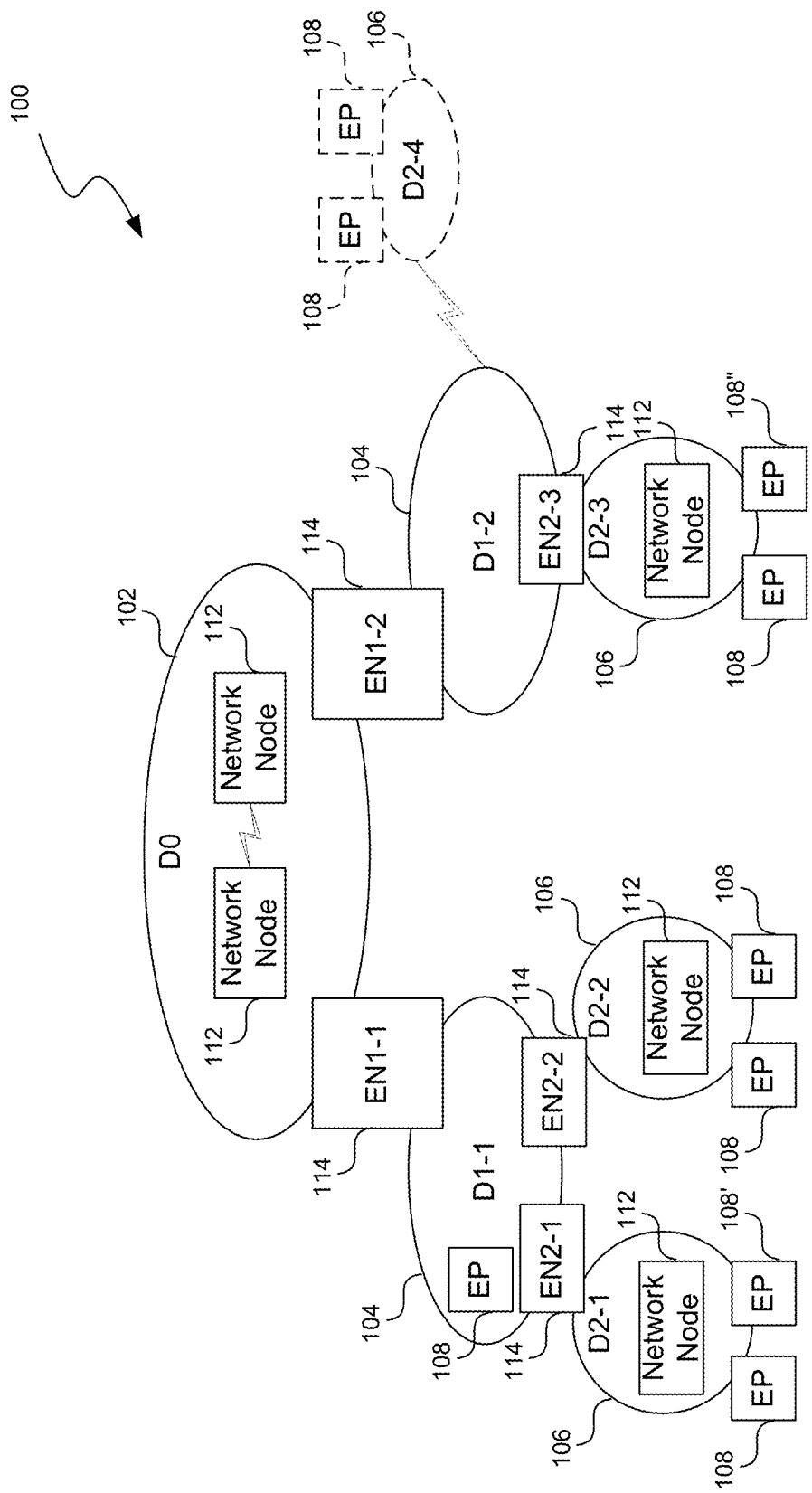
FIGS. 1A and 1B are schematic diagrams illustrating hierarchical partitioning of a computer network in accordance with embodiments of the present technology.

Certain embodiments of systems, devices, components, modules, routines, and processes for configuring and operating computer networks are described below. In the following description, specific details of components are included to provide a thorough understanding of certain embodiments of the present technology. A person skilled in the relevant art will also understand that the technology may have additional embodiments. The technology may also be practiced without several of the details of the embodiments described below with reference to FIGS. 1A-10.

As used herein, the term "computer network" generally refers to an interconnection network having a plurality of network nodes that connect a plurality of end points to one another and to other networks (e.g., the Internet). The term "network node" generally refers to a physical or software emulated network device. Example network nodes include routers, switches, hubs, bridges, load balancers, security gateways, firewalls, network name translators, or name servers. Each network node may be associated with a network node identifier having a distinct value in a computer network.

Also used herein, the term "control plane" of a computer network generally refers to a part of a network architecture that is concerned with determining destinations for and/or manners with which network traffic is carried in the computer network. A control plane can include computation, configuration, and/or management of routing or forwarding tables in network nodes using a centralized controller or distributed routing or forwarding protocols, for example, BGP, OSPF, ISIS, LDP, RSVP, etc. Other control plane functions can also include bandwidth allocation, traffic management, congestion control, network route protection computation, failure recovery, system configuration, management, analytics, and/or other network operations.

The term "forwarding plane" of a computer network generally refers to another part of the network architecture that carries network traffic. The forwarding plane forwards network traffic to a next hop along a network route or forwarding path established according to control plane logic or protocols. Forwarding plane packets go through the network nodes, which utilize the forwarding tables established by the control plane to perform routing, switching, and transporting messages such as packets at each network node.

The term "end point" generally refers to a physical or software emulated computing device. Example end points include network servers, network storage devices, personal computers, mobile computing devices (e.g., smartphones), or virtual machines. Each end point may be associated with an end point identifier that can have a distinct value in a computer network. Examples of end point identifiers (or network node identifiers) can include at least a portion of a label used in a multiprotocol label switched ("MPLS") network, a stack of labels used in a MPLS network, one or more addresses according to the Internet Protocol ("IP"), one or more virtual IP addresses, one or more tags in a virtual local area network, one or more media access control addresses, one or more Lambda identifiers, one or more connection paths, one or more physical interface identifiers, or one or more packet headers or envelopes.

The term "domain" generally refers to a physical or logical partition of a computer network. A domain may include a select number of network nodes interconnected with one another and/or with a number of end points in the computer network. A domain may also be connected to one or more higher-level domains that include a number of additional network nodes that connect the particular domain to other domains at the same or different levels in a hierarchy of domains. In the following description, a software defined network ("SDN") using one or more SDN controllers is used to illustrate embodiments of partitioning a computer network. However, in other embodiments, one or more of the domains of the computer network be at least partially a distributed computer network that use distributed routing and/or forwarding protocols.

The individual network nodes and end points in a domain may individually contain a forwarding table that specifies manners of forwarding messages (e.g., packets of data) to another end point in the computer network. In certain embodiments, the forwarding table may include a plurality of entries individually specifying a network route, forwarding path, physical interface, or logical interface corresponding to a particular value of an end point identifier. An example entry can be as follows with suitable values for each identifiers:

| Destination | Incoming end point identifier | Outgoing end point identifier | Interface identifier |
|---|---|---|---|

In certain embodiments, the incoming identifier and the outgoing identifier may have different values. As such, at least a portion of an end point identifier may change in conjunction with forwarding a message from a network node. In other embodiments, the incoming identifier and the outgoing identifier may have the same values, and the example entry may be as follows instead:

| Destination | End point identifier | Interface identifier |
|---|---|---|

In further embodiments, the forwarding table may include a plurality of entries that individually reference entries in one or more other tables based on a particular value of an end point identifier.

Scaling up computer networks to interconnect a large number of end points may be difficult or even impossible based on existing network technology. For example, computing network routes between pairs of a million end points in a computer network may result in routing tables that exceed memory capacities of any existing routers. In another example, traffic engineering techniques may be difficult to implement because computation of traffic engineering tunnels is NP-complete.

Several embodiments of the present technology can improve scalability of computer networks by partitioning a computer network into distinct domains interconnected with one another in a hierarchy. The individual domains can include a manageable number (e.g., 256, 512, 1024, or other suitable numbers) of end points individually identified by an end point identifier. In certain embodiments, the end point identifiers can individually have a distinct value corresponding to the end points in a particular domain and one or more higher-level domains that the particular domain is connected to. Examples of end point identifiers are described below with reference to FIGS. 5-7.

Control plane functions (e.g., computation of network routes) and/or forwarding plane functions (e.g., routing, forwarding, switching) may be partitioned and performed individually on per domain basis based on (1) a network configuration of a particular domain (e.g., end points and/or lower-level domains in the particular domain); and (2) one or more higher-level domains connected to the particular domain in the hierarchy. For example, if a destination end point of a packet is in the same domain as an originating end point, the packet may be forwarded directly to the destination end point in the same domain according to a pre-computed network route. For packets destined to end points not in the same domain, the packets may be forwarded to one or more higher-level domains, which in turn independently perform further routing, forwarding, or other processing of the packets based on the end point identifiers. Thus, a particular domain may only need to recognize (1) the end points in the particular domain (including any lower-level domains) and (2) the end points of the one or more higher-level domains in order to independently perform various control plane and/or forwarding plane functions. As a result, the originating domain can manage various network operations in the domain without concerns regarding network operations in the other domains of the hierarchy. Thus, network configuration and/or operation in each partitioned domain may be maintained at a manageable level even as the size of the overall computer network increases.

FIG. 1A is a schematic diagram illustrating hierarchical partitioning of a computer network 100 into a plurality of domains in a hierarchy in accordance with embodiments of the present technology. As shown in FIG. 1A, the computer network 100 can include a core domain 102 (identified as D0) interconnecting one or more level-one domains 104 (identified individually as D1-1 and D1-2). The level-one domains 104 can each include one or more level-two domains 106 (identified individually as D2-1 and D2-2), which in turn can include one or more end points 108 (identified as EPs) and one or more network nodes 112. In FIG. 1A, three domain levels and particular numbers of domains at each level are shown for illustration purposes. In other embodiments, the computer network 100 may be partitioned into any suitable levels of domains with suitable numbers of domains and/or end points at each level.

The core domain 102 can include one or more network nodes 112 interconnected to one another. Two network nodes 112 are shown in FIG. 1A for illustration purposes. In other embodiments, the core domain 102 may include any suitable number of network nodes 112 and/or other suitable components. The network nodes 112 can include various computing and/or communications components to facilitate communications between pairs of end points 108 in lower-level domains. For example, the network nodes 112 of the core domain 102 can include one or more label switched routers, long haul dense wavelength division multiplexing modules, dynamic context routers, interface message processors, and/or other suitable components.

The computer network 100 may also include one or more edge nodes between pairs of domains at adjacent levels in the hierarchy. As used herein, an edge node generally refers to a network node between a lower-level domain and an interconnected higher-level domain. The edge node is both (1) a destination for the higher-level domain; and (2) an entry point for the lower-level domain, or vice versa. For example, the level-one domain D1-1 can include a level-one edge node 114 (identified as EN1) that interfaces with the core domain 102. The level-one domain D1-1 can also include a level-two edge node 114 (identified as EN2-1) that interfaces with the level-two domain D2-1 and another level-two edge node 114 (identified as EN2-2) that interfaces with the level-two domain D2-2. The level-one domain D1-2 can include a level-one edge node 114 (identified as EN1-2) that interfaces with the core domain D0 and a level-two edge node 114 (identified as EN2-3) that interfaces with the level-two domain D2-3.

As discussed in more detail below, any end points 108 in a particular domain in the hierarchy may reach other end points 108 in other domains by identifying one or more edge nodes at a lower level of the hierarchy and one or more edge nodes at a higher level of the hierarchy to the particular domain. For example, an end point 108 in the level-one domain D1-1 may reach any other end points 108 in the hierarchy by recognizing (1) the level-one edge node EN1-1 and (2) the level-two edge node EN2-1 and EN2-2.

Figure 1B:
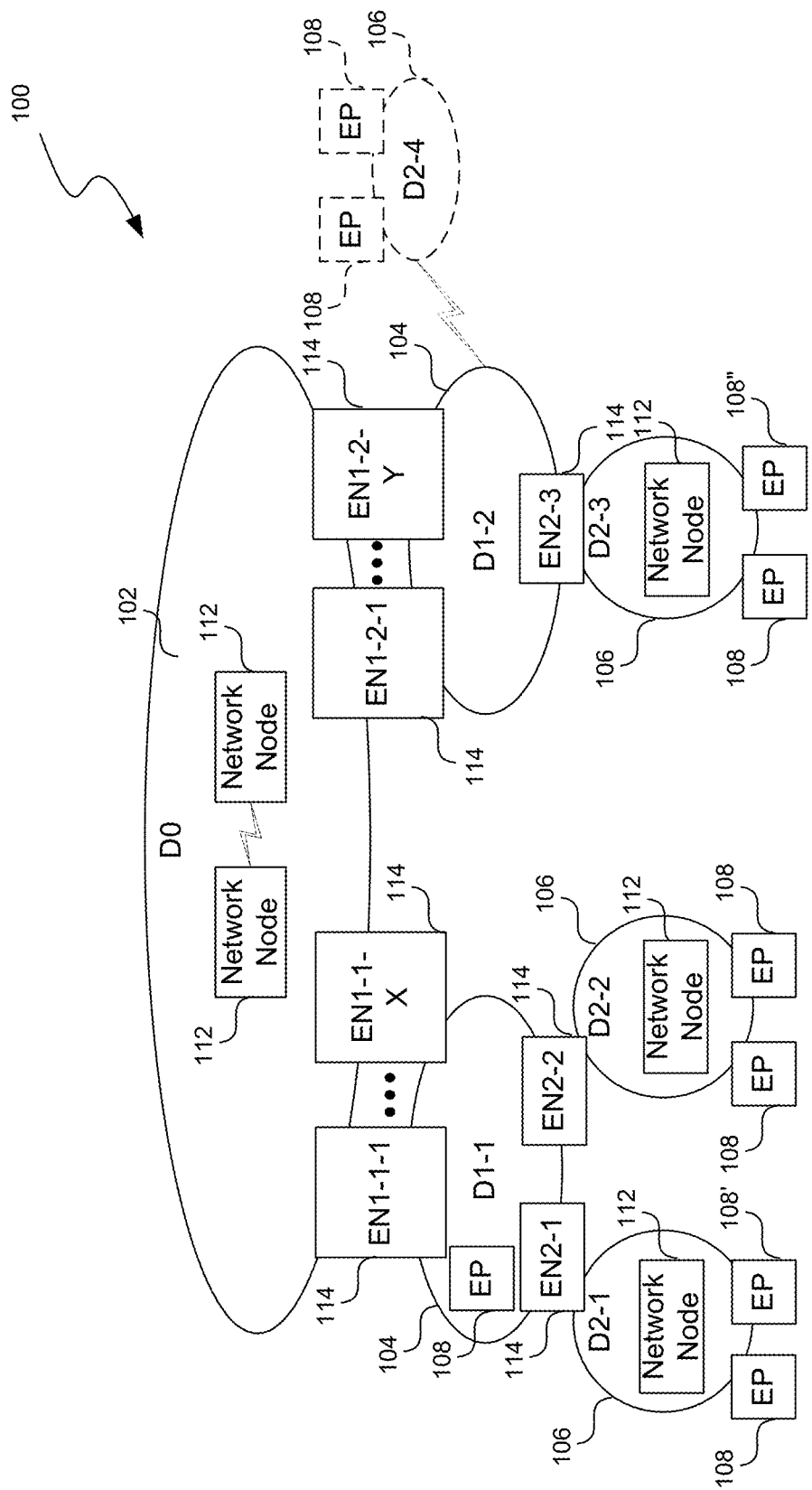

Even though only one edge node 114 is shown between pairs of domains at adjacent levels in FIG. 1A, in certain embodiments, the individual edge nodes 114 may include a group of edge nodes 114 having the same forwarding state (e.g., a destination hop or a forwarding path in the computer network 100). For example, as shown in FIG. 1B, the level-one domain D1-1 includes a group of edge nodes 114 identified as EN1-1-1 to EN1-1-X. The level-one domain D1-2 includes a group of edge nodes 114 identified as EN1-2-1 to EN1-2-Y. In other examples, the level-two edge nodes EN2-1, EN2-2, and EN2-3 can also each include a group of edge nodes (not shown). In certain embodiments, packets from a particular domain may pass through any one of the edge nodes 114 in an edge node group to reach a desired destination. For example, the end point 108 in the level-one domain D1-1 may reach any end points 108 in the level-two domain D2-3 through any one of the edge nodes EN1-1-1 to EN1-1-X. In other embodiments, packets from the particular domain may pass through a particular one of the edge nodes 114 in the edge node group utilizing techniques such as traffic engineering. In further embodiments, packets from the particular domain may pass through the edge nodes 114 in an edge node group in other suitable manners.

Referring back to FIG. 1A, each domain of the computer network 100 can independently manage control plane functions (e.g., computation of network routes) and/or forwarding plane functions (e.g., routing, forwarding, switching) based on (1) a network configuration of the end points 108 in the particular domain and (2) a position and connectivity of the domain in the hierarchy. For example, a forwarding table for the level-two domain D2-1 may be computed based on (1) a configuration of the end points 108 in the level-two domain D2-1 and (2) the identity of its higher-level domains (i.e., the level-one domain D1-1 and the core domain D0). For instance, the forwarding table may include entries specifying one or more network routes (e.g., via the network node 112 or other network nodes, not shown) from an originating end point 108 in the domain D2-1 to a destination end point 108 in the same domain. In certain embodiments, forwarding tables in the edge nodes 114 may contain network routes to all end points 108 in a particular domain while those in other network nodes 112 in the domain may only contain network routes to a portion of the end points 108. In other embodiments, forwarding tables in all edge nodes 114 and network nodes 112 may contain network routes to all end points 108 in the particular domain.

Continuing with the previous example, the forwarding table may also include one or more entries that specifying a network route for all destination end points 108 that are not in the level-two domain D2-1. For example, all destination end points 108 in the level-two domain D2-2 may have the same network route in the level-two domain D2-1 that points to the level-two edge node EN2-1. All destination end points 108 in the level-two domain D2-3 may have the same network route that points to the level-two edge node EN2-1, the level-one edge node EN1-1, or one of the network nodes 112. Thus, by designating one network route for multiple destination end points 108 in the other domains, the multiple destination end points 108 may be deemed as "aggregated" to a single (or limited number of) destination(s). Thus, the forwarding table for the level-two domain D2-1 may include a manageable number of entries (e.g., less than 3,000 entries). As a result, costly equipment for network nodes in the first level-two domain D2-1 may be avoided, and operating complexity may be reduced compared to conventional techniques.

The level-one domain D1-1 may also include a similar forwarding table in its network nodes (e.g., the level-one edge node 114). The forwarding table may include entries that specify one or more network routes from an originating lower-level domain (e.g., the level-two domain D2-1) to a destination lower-level domain (e.g., the level-two domain D2-2) in the same domain. If the destination lower-level domain is not in the level-one domain D1-1, the level-one domain D1-1 may specify a network route, for example, to the edge node EN1-1 to the core domain 102. The core domain 102 may also include another forwarding table in the network nodes 112 having entries each specifying a network route to a lower-level domain in a similar fashion as the level-one domains D1-1.

The forwarding tables of the domains in the computer network 100 can also include entries specifying a network route for incoming messages to particular destination end points 108 in a particular domain. For example, the forwarding table in the level-one domain D1-2 may include an entry that specifies a network route from the level-one edge node EN1-2 to the level-two edge node EN2-3 for all end points 108 in the level-two domain D2-3. The forwarding table in the level-two domain D2-3 can then include one or more network routes for each of the end points 108 in that domain. Several examples are discussed below to illustrate example operations of the computer network 100. In other embodiments, the computer network 100 may have other suitable operating sequences, conditions, and/or other characteristics.

In operation, a network node 112 (or an edge node 114) in a domain may receive a packet with an associated destination end point identifier from an originating end point 108 (e.g., the end point 108 in the level-two domain D2-1). The network node 112 (or the edge node EN2-1) compares the value of the destination end point identifier to entries in its forwarding table and determines a network route for forwarding the packet. If the destination (e.g., the end point 108') is in the same domain (i.e., the level-two domain D2-1), one of the entries may specify a network route to directly forward the message to the end point 108', for example, via the network node 112.

If the destination (e.g., the end point 108" in domain D2-3) is not in the same domain as the originating end point 108, the entries may specify a network route pointing to a higher-level domain (e.g., the level-one domain D1-1). As a result, the network node 112 forwards the packet to the edge node EN2-1. At the level-one domain D1-1, the edge node EN2-1 compares the value of the destination end point identifier with entries of its forwarding table and determines a network route to the edge node EN1-1 in the core domain 102. At the core domain 102, the edge node EN1-1 compares the value of the destination end point identifier with entries of its forwarding table and determines a network route through one or more of the network nodes 112 to the edge node EN1-2. The edge node EN1-2 in turn determines a network route to the edge node EN2-3, which then determines a route to forward the message to the end point 108".

As discussed above, each of the domains and associated lower-level domains in the computer network 100 can each independently manage own network operations. For example, each of the domains can independently manage control plane functions and/or forwarding plane functions based on a network configuration of a particular domain and one or more higher-level domains connected to the particular domain. Thus, the network operations of a particular domain may not depend upon knowledge of the network state of the entire computer network but instead the network state of the particular domain. The term "network state" generally refers to identification and connection of network nodes and/or end points, current operating status of the network nodes and/or end points (e.g., link up/down, etc.), bandwidth allocation in a computer network, and/or other suitable data related to a condition and/or characteristic of the computer network. As a result, expansion of the computer network 100 has a limited or no impact on operation complexity of the existing domains. For example, if the computer network 100 is expanded to include another level-two domain D2-4 (shown in phantom lines for clarity), operations of the other level-two domains 106 would only require limited adjustment. For instance, the forwarding tables in the level-two domains D2-1, D2-2, and D2-3 may need to be updated to recognize additional end points 108 in the new level-two domain D2-4. However, the number of entries in the forwarding table should not increase substantially because the additional end points in the new domain D2-4 can be "aggregated" with other end points not in the individual domains. As a result, the computer network 100 may be expanded to include millions or tens of millions of end points 108 while generally maintaining similar levels of operation complexity in each domains.

Figure 2:
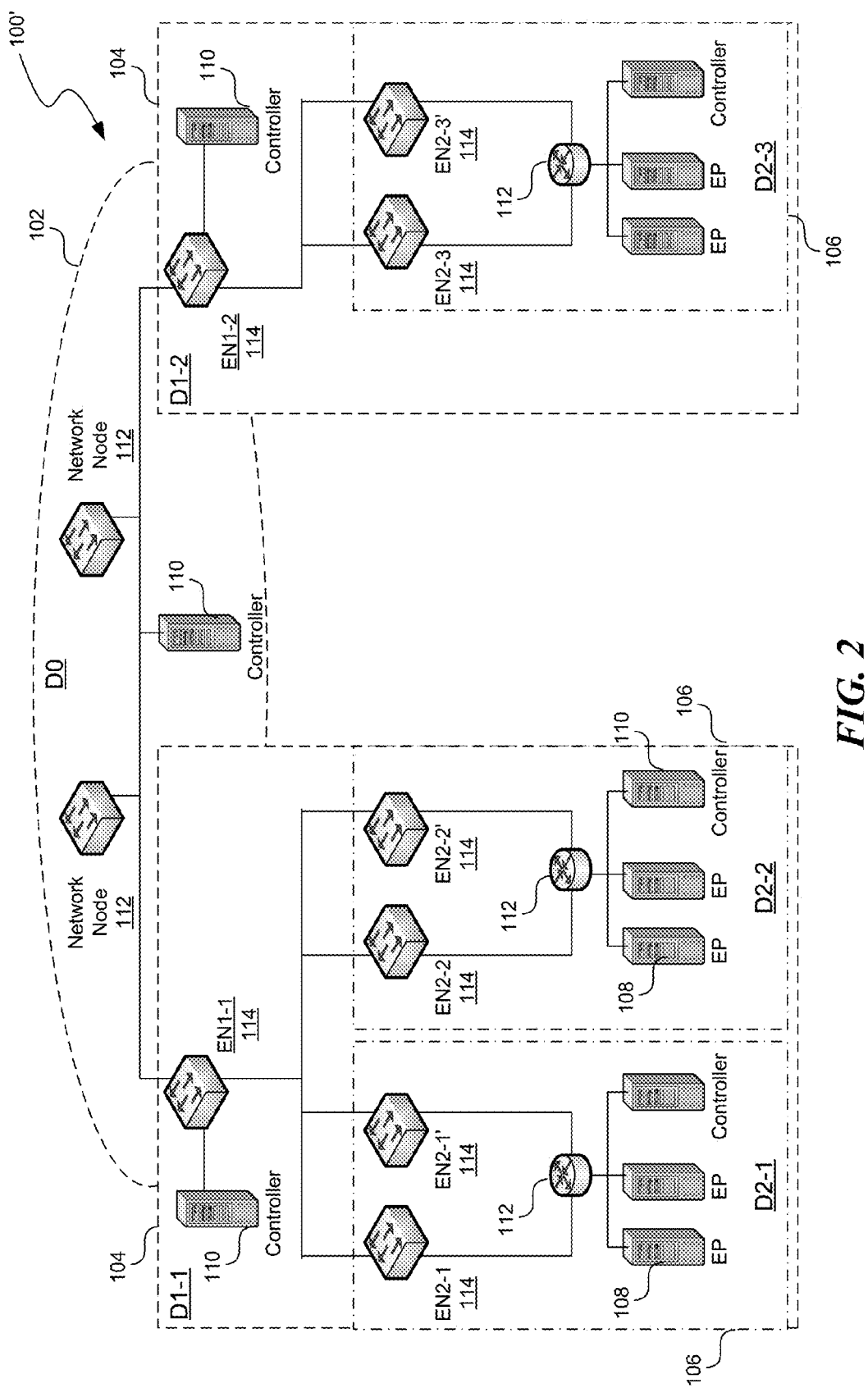
FIG. 2 is a schematic diagram illustrating an example application of the hierarchical partitioning technique in FIG. 1A to a computer network for a data center or multiple data centers in accordance with embodiments of the present technology.

FIG. 2 is a schematic diagram illustrating an example application of the hierarchical partitioning technique in FIG. 1A to a computer network 100 for a data center or multiple data centers in accordance with embodiments of the present technology. As shown in FIG. 2, the computer network 100 can include a core domain 102 having one or more network nodes 112. The computer network 100' can also include one or more level-one domains 104. Two level-one domains 104 are shown in FIG. 2 for illustration purposes and are individually identified as domains D1-1 and D1-2. In the illustrated embodiment, the level-one domain D1-1 includes two level-two domains 106 (individually identified as D2-1 and D2-2). The level-one domain D1-2 includes one level-two domain D2-3. In other embodiments, the level-one domains 104 can include other suitable number of domains and/or end points.

The level-two domains 106 can individually include one or more end points 108, one or more edge nodes 114, and one or more network nodes 112 connecting the end points 108 to the edge nodes 114. In one embodiment, the network nodes 112 can individually include a top-of-rack ("TOR") router or switch. In other embodiments, the network node 112 can include a bridge, a gateway, or other suitable communications device. In the illustrated embodiment, each of the level-two domains 106 include two edge nodes 114 (e.g., edge nodes EN2-1 and EN2-1') forming an edge node group. In certain embodiments, the edge nodes 114 in an edge node group may be accessed randomly, for example, for non-traffic engineering type packets. In other embodiments, one of the edge nodes 114 in an edge node group may be particularly identified and specified to handle, for example, traffic engineering type packets. In further embodiments, the edge nodes 114 may be accessed in other suitable manners based on any other suitable criteria. In any of the foregoing embodiments, the same end point identifier may be used, as discussed in more detail below with reference to FIG. 3.

As shown in FIG. 2, the individual domains in the computer network 100' can include a network controller 110 (referred to herein as "controller") adapted to configure, monitor, and/or control network operations in a particular domain. In the illustrated embodiment, the network controllers 110 are shown as individual computing devices. In other embodiments, the network controllers 110 may be a server or virtual machine at one of the end points 108. In further embodiments, multiple domains (e.g., the level-two domains D2-1 and D2-2) may share a common network controller 110. Examples of the controllers 110 are discussed in more detail below with reference to FIG. 4.

The hierarchical partitioning shown in FIG. 2 may be overlaid on one or multiple data centers in various manners. For example, in certain embodiments, the hierarchical partitioning shown in FIG. 2 may be overlaid on one data center with the core domain 102 including one or more T3 broadband switches of the data center. The level-one domains 106 can include T2 switches which are connected to level-two domains 106 having T1 and/or TOR switches. In other embodiments, the level-one domains 104 may include both T2 and T1 switches while the level-two domains 106 include the TOR switches. In another example, the hierarchical partitioning shown in FIG. 2 can also be overlaid on multiple data centers. For instance, the core domain 102 may include a core network interconnecting multiple data centers and the T3 broadband switches. Within each data center, the level-one domains can include the T2 switches while the level-two domains can include the T1 and/or TOR switches. In further examples, the partitioned computer network 100' may include additional and/or different partitioning levels.

Figure 3:
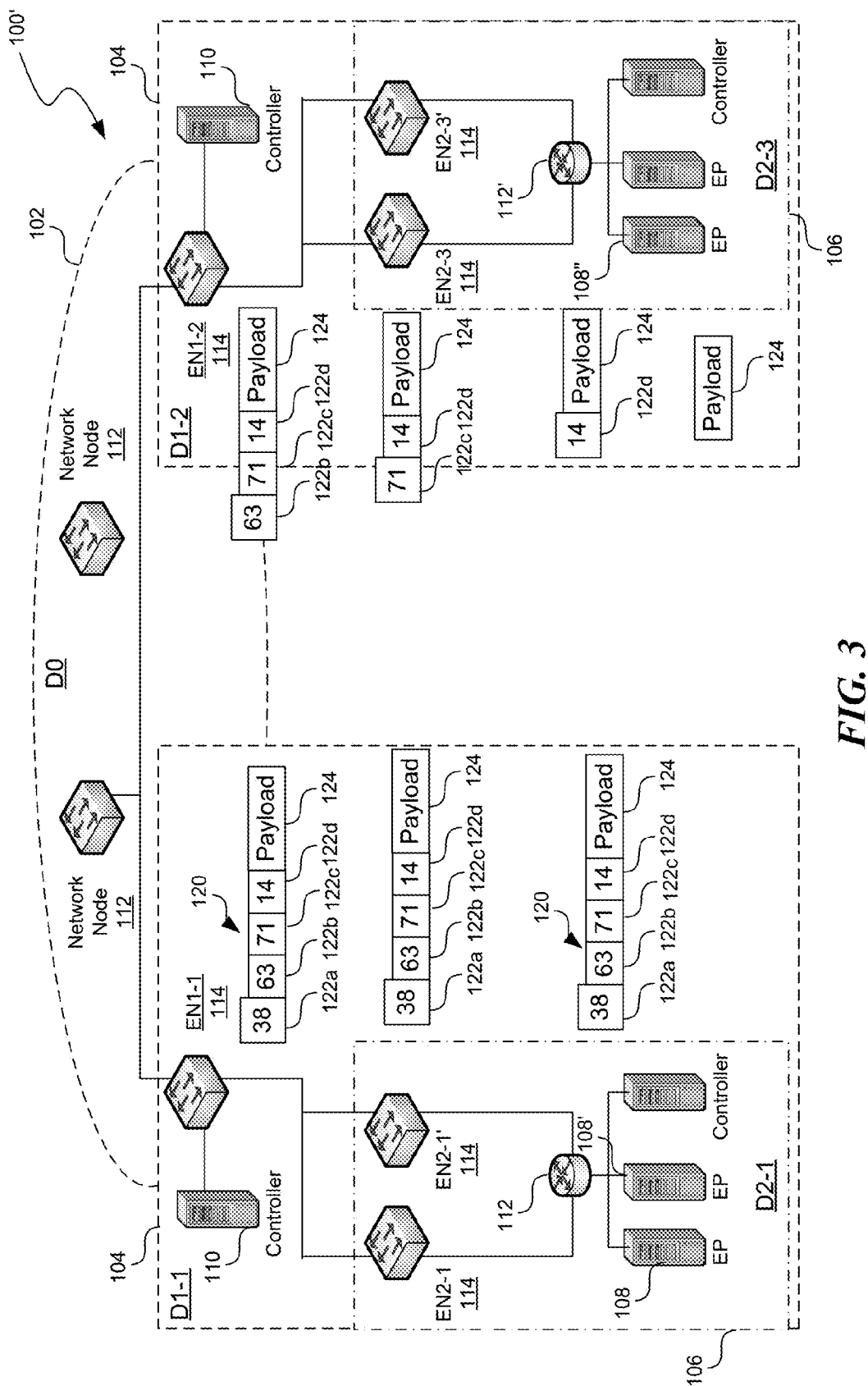
FIG. 3 is a schematic diagram illustrating operations of the computer network in FIG. 2 utilizing example end point identifiers in accordance with embodiments of the present technology. Certain portions of the computer network in FIG. 2 is omitted for clarity.
Figure 7:
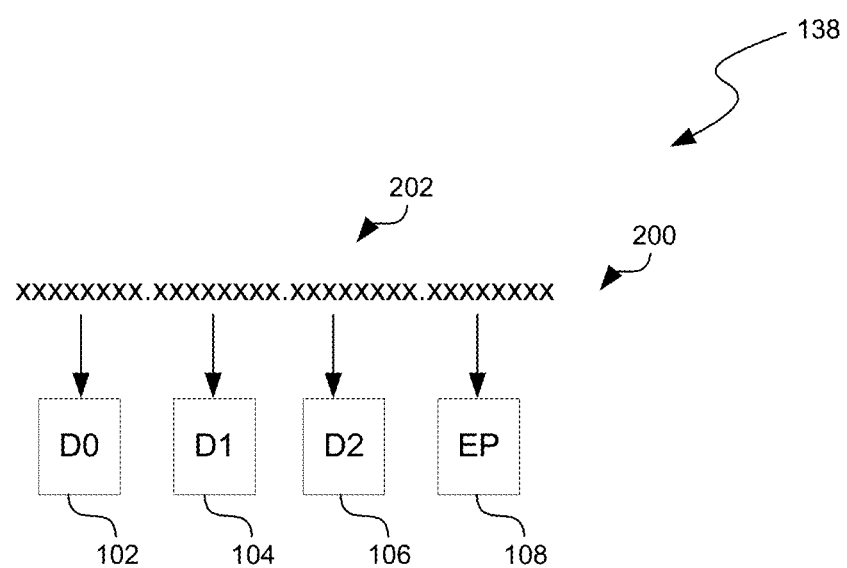
FIG. 7 is a schematic diagram illustrating one example of end point identifier using IP addresses in accordance with embodiments of the present technology.

In certain embodiments, each end point 108 in the computer network 100' may be distinctly identified by a value of an end point identifier 120 having a plurality of sections arranged in a stack. Each of the sections can correspond to a physical or logical location of the end point 108. For example, as shown in FIG. 3, a destination end point 108" in the level-two domain D2-3 may be distinctly identified by a stack having four sections 122a-122d that each correspond to a physical or logical location of the end point 108". In the illustrated example, each level of domain in the hierarchy is associated with a section of the edge point identifier 120 and may be used to reach one or more corresponding edge nodes 114 associated with the particular domain. For instance, the first section 122a has a value corresponding to the core domain 102 with an example value of 38. The second section 122b has a value corresponding to the level-one domain D1-2 with an example value of 63. The third section 122c has a value corresponding to the level-two domain D2-3. The fourth section 122d has a value corresponding to the server or virtual machine at the end point 108" with an example value 14. In other embodiments, the end point identifier can also include a single section or a compound end point identifier having a plurality of end point identifiers, as shown in FIG. 5. In further embodiments, the end points 108 may be identified in other suitable manners and/or values, one example using IP addresses is shown in FIG. 7.

The following discussion illustrates example operations for forwarding a packet from an end point 108 in the level-two domain D2-1 to the end point 108" in a different level-two domain D2-3. In operation, the end point 108 can generate a packet with the end point identifier 120 and a payload 124 based on, for example, an IP address or other suitable identification of the destination end point 108" in the domain D2-3. The end point identifier 120 can include a value for each of the sections 122a-122d, as discussed above. In the illustrated embodiment, the end point 108 forwards the generated packet to the network node 112. The network node 112 compares the value in the top section of the end point identifier 120 (i.e., the first section 122a) to entries in a forwarding table (not shown) in the network node 112 to determine a forwarding path or next hop for forwarding the packet. For example, in one embodiment, the value of "38" may correspond particularly to a forwarding path to the level-two edge node EN2-1, which in turn compares the top section of the end point identifier 120 to its forwarding table to determine another forwarding path to the level-one edge node EN1-1. In other embodiments, the value of "38" may correspond to the edge node group including the edge nodes EN2-1 and EN2-1'. In such an embodiment, one of the edge nodes EN2-1 and EN2-1' may be selected to forward the packet randomly, for example, using a hashing function, or in other suitable manners.

The level-one edge node EN1-1 then forwards the message to one or more of the network nodes 112 at the core domain 102. One or more of the network nodes 112 compares the top section to entries in its forwarding table, removes the top section (i.e., the first section 122a), and forwards the message to the level-one edge node EN1-2. The level-one edge node EN1-2 then compares the top section (i.e., the second section 122b) to entries in its forwarding table, removes the top section (i.e., the second section 122b), and forwards the message to the level-two edge node EN2-3 or the edge node group containing the edge nodes EN2-3 and EN2-3'. The level-two edge node EN2-3 (or EN2-3') then compares the top section (i.e., the third section 122c) to entries in its forwarding table, removes the top section (i.e., the third section 122c), and forwards the message to the network node 112' in the domain D2-3. The network node 112' then compares the top section (i.e., the fourth section 122d) to entries in its forwarding table, removes the top section (i.e., the fourth section 122d), and forwards the payload of the message to the end point 108".

In the embodiments discussed above, the network nodes 112, the edge nodes EN2-1, EN1-1, EN1-2, EN2-3 do not modify the top section of the end point identifier 120 during network processing. In other embodiments, at least one of the foregoing components may swap a value of the top section of the end point identifier 120 before forwarding the packet along the determined network route. The swapping may be recorded and stored in the respective components. In further embodiments, the end point 108 may forward the message directly to the edge nodes 114 without passing through the network nodes 112. In yet further embodiments, the edge nodes EN1-2, EN2-3 and the network node 112' may perform respective forwarding functions without removing the top section of the end point identifier 120, for example, by identifying which section of the end point identifier 120 corresponds to a particular domain and associated edge nodes 114.

In another example, the end point 108 in the level-two domain D2-1 may also transmit a packet to the end point 108' in the same domain in a similar fashion. For example, the end point 108 in the level-two domain D2-1 may generate a packet with the end point identifier 120 and a payload 124. The end point identifier 120 may include only one section (e.g., the fourth section 122d) having a value (e.g., 22) that corresponds to the end point 108'. The end point 108 then transmits the packet with the end point identifier 120 and payload to 124 to the network node 112. The network node 112 compares the value in the top section of the end point identifier 120 (i.e., the fourth section 122d) to entries in the forwarding table, removes the top section of the end point identifier 120, and forwards the packet to the end point 108' along a determined forwarding path.

Figure 4:
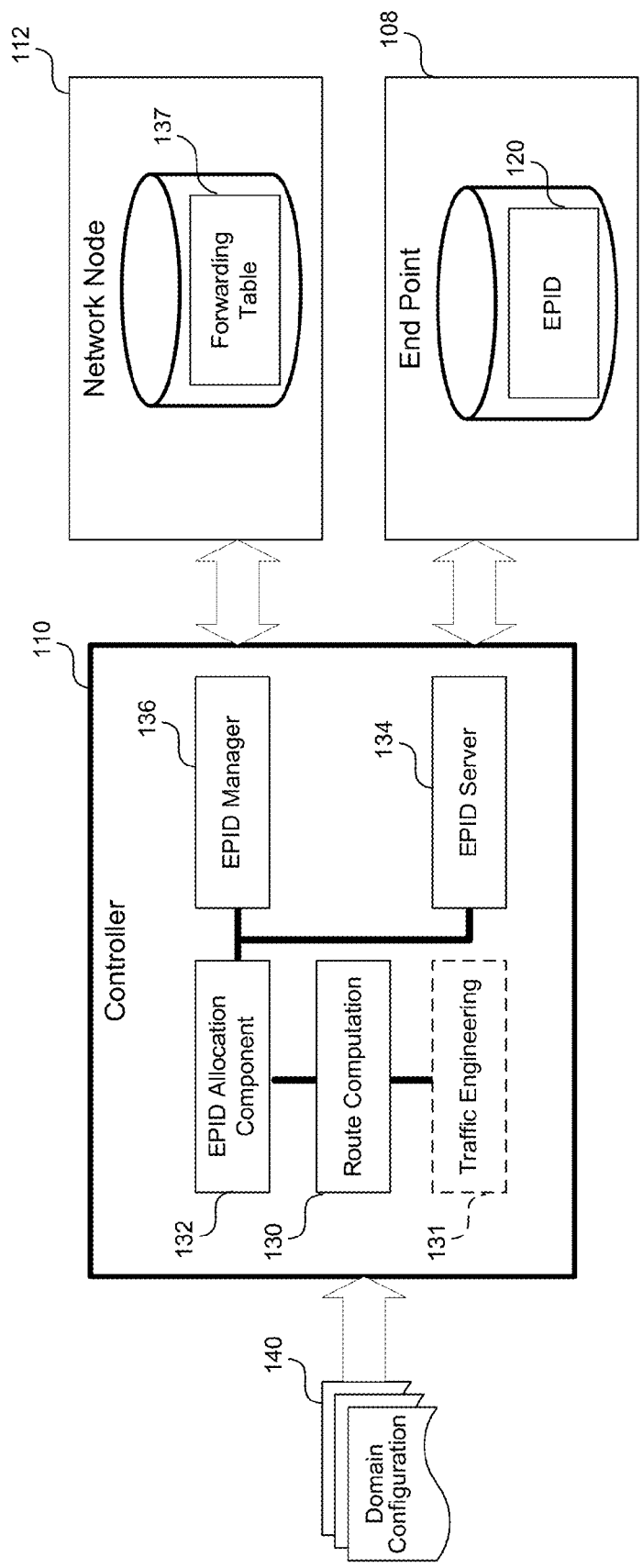
FIG. 4 is a block diagram showing example software components of the network controller in FIG. 3 in accordance with embodiments of the present technology.

FIG. 4 is a block diagram showing example software components of the controller 110 in FIG. 3 in accordance with embodiments of the present technology. In FIG. 4 and in other Figures hereinafter, individual software components, modules, and routines may be a computer program, procedure, or process written as source code in C, C++, C sharp, Java, and/or other suitable programming languages. The computer program, procedure, or process may be compiled into object or machine code and presented for execution by a processor of a personal computer, a network server, a laptop computer, a smart phone, and/or other suitable computing devices. Various implementations of the source and/or object code and associated data may be stored in a computer memory that includes read-only memory, random-access memory, magnetic disk storage media, optical storage media, flash memory devices, and/or other suitable storage media.

In certain embodiments, the controller can include or be operatively coupled to a database or network storage device containing records of network state of one or more domains of a hierarchy. The records of network state can include data related to identification of network nodes, connection of the network nodes and/or end points, current operating status of the network nodes and/or end points (e.g., link up/down, etc.), bandwidth allocation in the domain, and/or other suitable network data. As discussed above, by partitioning the control plane functions and/or forwarding plane functions, monitoring a network state of each domain can be simplified when compared to conventional techniques.

As shown in FIG. 4, the controller 110 can include a route computation component 130, an end point identifier allocation component 132, an end point identifier server 134, an end point identifier manager 136, and an optional traffic engineering component 131 operatively coupled to one another. Even though particular components of the controller 110 are shown in FIG. 4, in other embodiments, the controller 110 can also include one or more input/output components and/or other suitable types of components.

The route computation component 130 can be configured to compute network routes in a particular domain based on input of domain configuration 140. The domain configuration 140 may include information of end points, network nodes, edge notes in a particular domain as well as in one or more higher-level domains in the hierarchy. The domain configuration 140 may be communicated to the controller 110 automatically using a network communications protocol, manually input by an operator, or in other suitable manners. The route computation component 130 may be implemented with various route computation techniques. For example, in one embodiment, network routes may be computed based on the shortest route from one end point to another. In other embodiments, routes may be computed based on equal cost multiple path routing in which a group of paths in a forwarding equivalent class may be designated with a single entry (or multiple entries). In further embodiments, the routes may be computed in conjunction with distributed routing protocols and/or other suitable techniques.

The optional traffic engineering component 131 may be configured to compute additional routes in the domain based on traffic engineering techniques. In certain embodiments, the traffic engineering component 131 can compute additional routes in the domain based on a nature of network traffic, measurements or simulation of the traffic, topology of the domain, and/or other suitable criteria. In other embodiments, the controller 110 may also include a bandwidth allocation component (not shown) that receives requests for network bandwidth from a source end point to a destination and provides the request to the traffic engineering component 131 to determine an allocation and forwarding paths that satisfy the requests. In further embodiments, the traffic engineering component 131 may be omitted.

The end point identifier allocation component 132 can be configured to compute and allocate values of end point identifiers to each end points in a domain based on the input of domain configuration 140. In certain embodiments, the values of end point identifiers can individually include a plurality of sections in a stack. In other embodiments, the values of end point identifiers can also include other suitable data schema. The end point identifier allocation component 132 can also be configured to associate a particular value of the end point identifiers to a network route computed by the route computation component 130 and/or the optional traffic engineering component 131.

The end point identifier manager 136 may be adapted to configure forwarding tables 137 in network node(s) 112 (and/or edge nodes 114) in the domain. Though not shown in FIG. 4, the end point identifier manager 136 and the network nodes 112 may also include suitable interfaces (e.g., an application program interface ("API")) to facilitate communications. In certain embodiments, the entries in the forwarding tables 137 may be generated statically. As such, the entries in the forwarding table 137 may be computed once. In other embodiments, the entries in the forwarding table 137 may be updated periodically, continuously, or in other suitable manners.

The end point identification server 134 can be configured to provide values of end point identifiers 120 when queried by an end point 108. The values of the end point identifiers 120 may be used by the edge nodes 114 (FIG. 1A) to determine a forwarding path for individual packets passing through the edge nodes 114. For example, in certain embodiments, an originating end point 108 may query the end point identification server 134 for a value of the end point identifier 120 associated with a destination end point 108 via a suitable interface (e.g., an API). In response, the end point identification server 134 provides the requested value to the originating end point 108. The requested value corresponds to one of the entries in the forwarding table 137 in the network node 112. The originating end point 108 may then append or otherwise modify a message or packet with the received value of the end point identifier associated with the destination end point 108, and transmit the message to the network node 112 for forwarding.

Figure 5A:
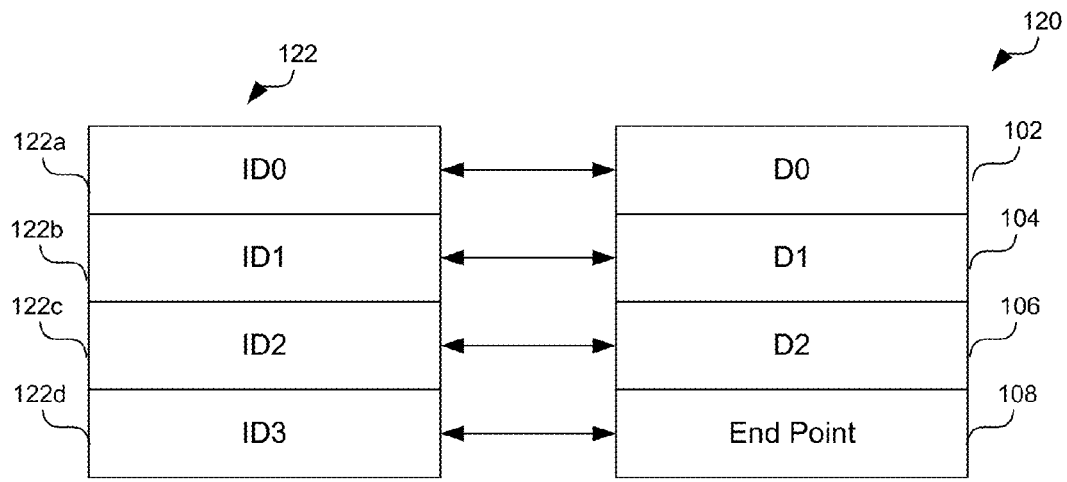
FIGS. 5A and 5B are block diagrams illustrating example end point identifiers having sections arranged in a stack in accordance with embodiments of the present technology.

FIG. 5A is a block diagram illustrating an example end point identifier 120 having sections 122a-122d arranged in accordance with embodiments of the present technology. As shown in FIG. 5A, the end point identifier 120 includes four sections 122a-122d in the end point identifier 120, individually identified as sections ID0, ID1, ID2, and ID3, and arranged according to a hierarchy of a computer network. For example, in the illustrated embodiment, each of the sections ID0, ID1, ID2, and ID3 may be configured to contain a value that corresponds to the core domain D0 (FIG. 1A), level-one domain D1 (FIG. 1A), level-two domain D2 (FIG. 1A), and the end point 108, respectively, in the computer network 100 shown in FIG. 1A. In other embodiments, at least one of the sections ID0, ID1, ID2, and ID3 may correspond to a different and/or additional domains. In further embodiments, the end point identifier 120 may include two, three, five, or any other suitable number of sections. In yet further embodiments, the end point identifier 120 may also be arranged in a queue, a list, a set, or other suitable data structures. In yet other embodiments, the sections ID0, ID1, ID2, and ID3 may correspond to a physical location associated with an end point in the computer network, as described in more detail below with reference to FIG. 5B.

Figure 5B:
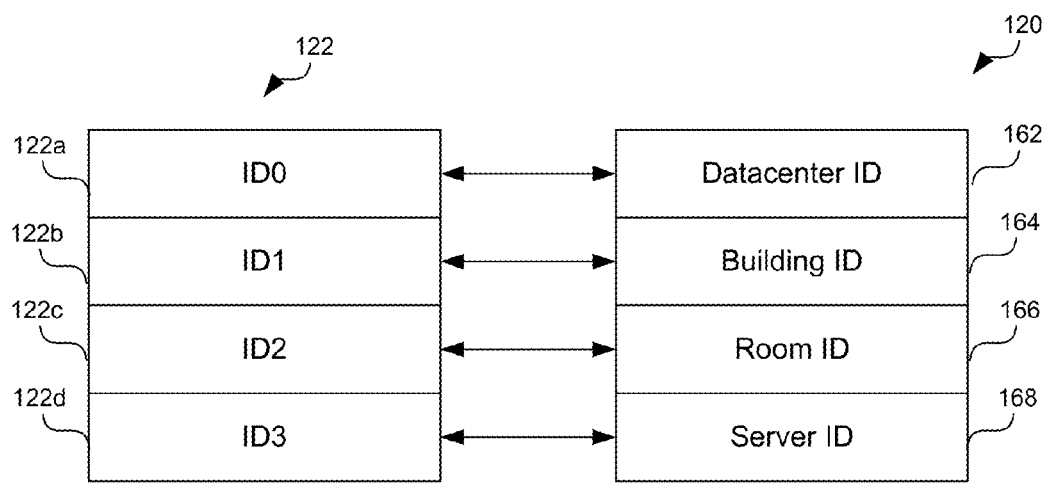

FIG. 5B is a block diagram illustrating another example end point identifier 120 having sections 122a-122d in accordance with embodiments of the present technology. As shown in FIG. 5B, the sections ID0, ID1, ID2, and ID3 may each correspond to a physical location associated with an end point. For example, the sections ID0, ID1, ID2, and ID3 may respectively correspond to a datacenter ID 162, a building ID 164, a room ID 166, and a server ID 168 of a network server. The network server identified by the server ID may be physically located in a room identified by the room ID 166 that is located in a building identified by the building ID 164 of a datacenter identified by the datacenter ID 162. In other examples, one of the sections ID0, ID1, ID2, and ID3 may also correspond to a row ID identifying a row in which the network server is located or a rack ID identifying a row in which the network server is located. In yet further examples, the section ID3 may also correspond to a virtual machine ID that identifies a virtual machine on a network server, for example, that is identified by the server ID 168. In yet other examples, the end point identifier 120 may have other suitable number of sections 122 and/or corresponding physical location IDs.

Figure 6:
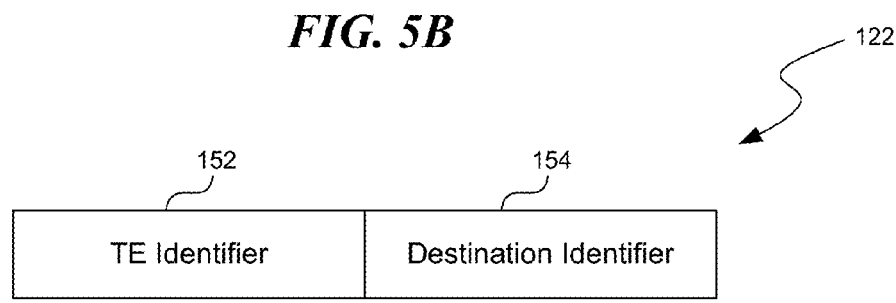
FIG. 6 is a block diagram illustrating one example of one of the sections in FIG. 5A or 5B in accordance with embodiments of the present technology.

FIG. 6 is a block diagram illustrating an example of one of the sections 122a-122d in FIG. 5 in accordance with embodiments of the present technology. As shown in FIG. 6, the section 122 can include an optional traffic engineering identifier 152 and a destination identifier 154. The traffic engineering identifier 152 may be configured to contain a value indicating that the section 122 is associated with a route computed by the optional traffic engineering component 131 (FIG. 4). The destination identifier 154 can be configured to contain a value corresponding to a domain, a physical location, a group of physical locations, a particular network node, a group of network nodes, an end point, or other suitable items. In further embodiments, the traffic identifier 152 may be omitted.

FIG. 7 is a schematic diagram illustrating one example of end point identifier using an IP address 200 in accordance with embodiments of the present technology. As shown in the illustrated embodiment in FIG. 7, the end point identifier 120 may include an IP address 200 having four sections 202 each with a number of bits (eight are shown for illustration purposes). Each of the sections 202 can represent and correspond to the domains D0, D1, and D2 or the end point 108 in the computer network 100 shown in FIG. 2. In other embodiments, an original IP address not assigned as shown in FIG. 7 may be processed to correspond to a virtual IP address such as that shown in FIG. 7. In further embodiments, the IP address 200 may include other suitable formats, such as according to IPv6.

Figure 8:
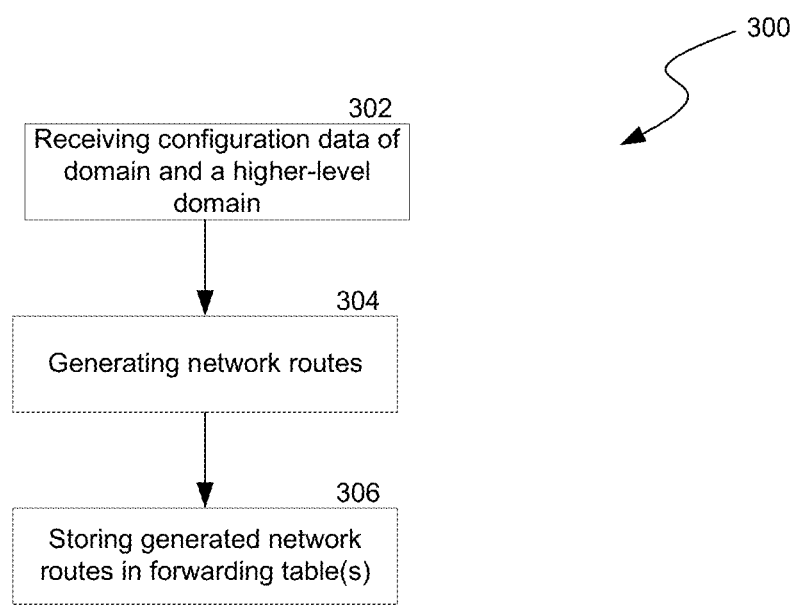
FIG. 8 is a flowchart illustrating an embodiment of a process of configuring a partitioned computer network in accordance with embodiments of the present technology.

FIG. 8 is a flowchart illustrating an embodiment of a process of configuring a partitioned computer network in accordance with embodiments of the present technology. As shown in FIG. 8, the process 300 can include receiving, at each domain, configuration data of the particular domain and one or more higher-level domains in a computer network partitioned hierarchically as shown in FIG. 1A at stage 302. The configuration data can include a number of and an identity of end points in the domain as well as connectivity of the end points. The configuration data can also include connectivity data to the higher-level domain such as the identity of the edge node to the higher-level domain.

The process 300 can also include generating network routes based on the received configuration data at stage 304. In certain embodiments, the routes can be computed between pairs of end points in the domain. In other embodiments, one or more routes may be computed to be directed to the edge node to the higher-level domain for end points not in the domain. The computed routes may then be stored with the end point identifiers in a forwarding table for the domain at stage 306.

Figure 9A:
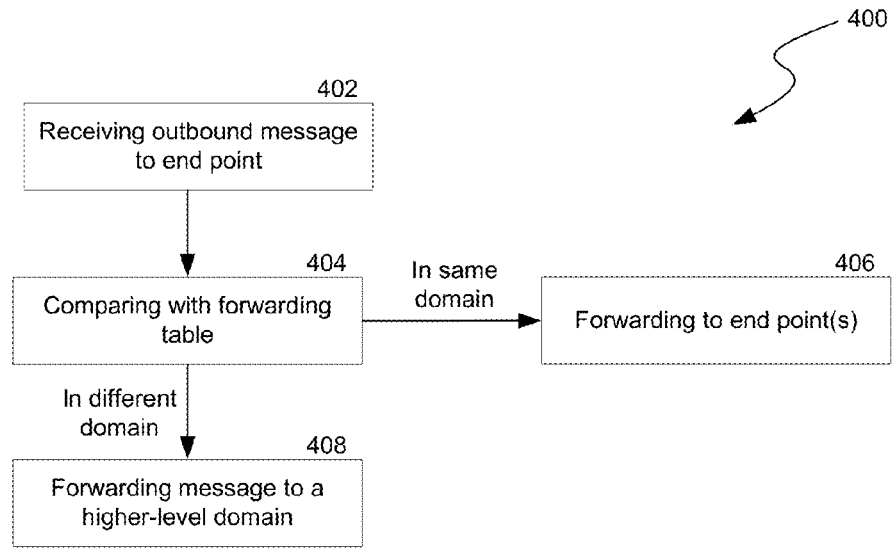
FIG. 9A is a flowchart illustrating an embodiment of a process of managing outbound communications in a domain in accordance with embodiments of the present technology.
Figure 9B:
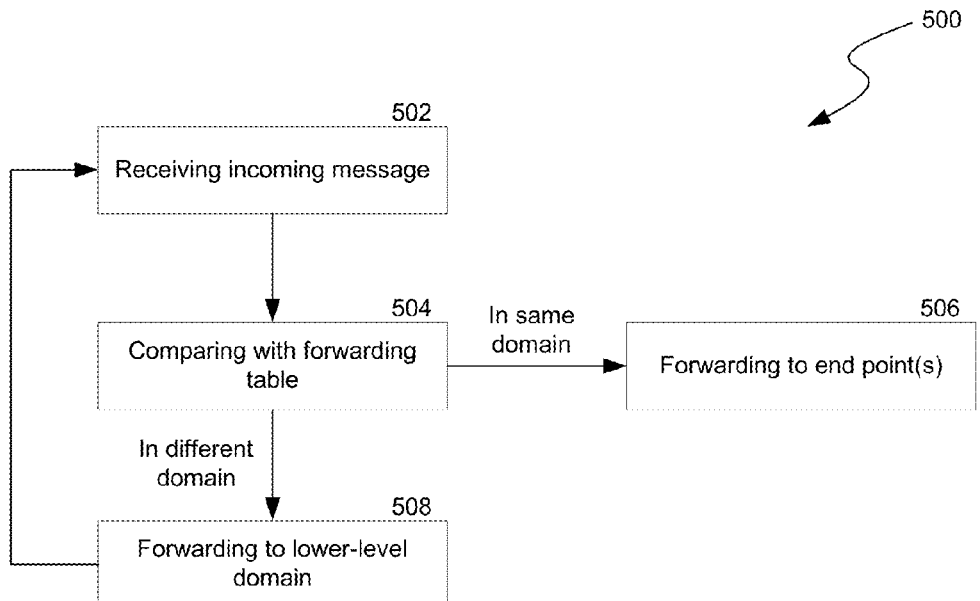
FIG. 9B is a flowchart illustrating an embodiment of a process of managing inbound communications in a domain in accordance with embodiments of the present technology.

FIG. 9A is a flowchart illustrating an embodiment of a process 400 of managing outbound communications and FIG. 9B is a flowchart illustrating a process 500 of managing inbound communications in a domain in accordance with embodiments of the present technology. As discussed below, the particular domain can manage the inbound and outbound communications independently from other domains, i.e., without concerns regarding routing, forwarding, or performing other network operations in other domains. As shown in FIG. 9A, the process 400 can include receiving, for example, at a network node 112 (FIG. 1A) or an edge node 114 (FIG. 1A) in a particular domain an outbound message to a destination end point at stage 402. The process 400 also include comparing an end point identifier associated with the received message to entries in a forwarding table in the network node 112 or the edge node 114 at stage 404. If the destined end point is in the same domain, the forwarding table includes an entry that specifies a network route to directly forward the message to the destination end point. The process 400 then includes forwarding the message to the destination end point following the specified network route. If the destined end point is not in the same domain, the forwarding table includes an entry that specifies another network route for forwarding the message to the higher-level domains. The process 400 then includes forwarding the message to the higher-level domains at stage 408.

FIG. 9B is a flowchart illustrating an embodiment of a process 500 of independently managing inbound communications in a domain in accordance with embodiments of the present technology. As shown in FIG. 9B, the process 500 includes receiving, for example, at an edge node 114 (FIG. 1A) of the domain, an incoming message at stage 502. The process 500 also includes comparing a value of an end point identifier associated with the message with entries of a forwarding table at the edge node 114 at stage 504. In one embodiment, a value in a top section of the end point identifier is compared to the entries in the forwarding table. In other embodiments, additional and/or different sections of the end point identifier may be used instead. If the destination is in the domain, the forwarding table includes an entry that specifies a network route to the end point, and the process 500 includes forwarding the message to the end point following the network route at stage 506. If the destination is not in the domain, the forwarding table includes an entry that specifies another network route to a lower-level domain, and the process 500 include forwarding the message to the lower-level domain at stage 508. In certain embodiments, the process 500 may optionally include removing the top section in the end point identifier before forwarding the message to the lower-level domain. In other embodiments, the top section may be swapped, maintained, and/or otherwise modified. The lower-level domain (and lower-level domain of the lower-level domain, if any) may perform operations generally similar to the process 500 until the message is forwarded to the destination end point.

Even though a forwarding table was used as an example technique for determining a network route in FIGS. 9A and 9B, in other embodiments, the network route may be determined on an ad hoc basis. For example, in one embodiment, in response to receiving an inbound or outbound message, a determination may be performed to decide whether the destination end point associated with the message is in the particular domain. In other embodiments, the determination may be performed on a continuous basis, periodic, basis, or other suitable basis.

FIG. 10 is a computing device 600 suitable for certain components of the computer network 100 in FIGS. 1A-3.

For example, the computing device 600 may be suitable for the end points 108 of FIG. 1A or the controller 110 of FIGS. 2 and 3. In a very basic configuration 602, computing device 600 typically includes one or more processors 604 and a system memory 606. A memory bus 608 may be used for communicating between processor 604 and system memory 606.

Depending on the desired configuration, the processor 604 may be of any type including but not limited to a microprocessor (μP), a microcontroller (μC), a digital signal processor (DSP), or any combination thereof. The processor 604 may include one more levels of caching, such as a level-one cache 610 and a level-two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, one or more applications 622, and program data 624. This described basic configuration 602 is illustrated in FIG. 6 by those components within the inner dashed line.

The computing device 600 may have additional features or functionality, and additional interfaces to facilitate communications between basic configuration 602 and any other devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, removable storage devices 636, and non-removable storage devices 638 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 600. Any such computer readable storage media may be a part of computing device 600. The term "computer readable storage medium" excludes propagated signals and communication media.

The computing device 600 may also include an interface bus 640 for facilitating communication from various interface devices (e.g., output devices 642, peripheral interfaces 644, and communication devices 646) to the basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method of transmitting packets in a computer network having a hierarchy of domains individually having one or more network nodes interconnected with one or more end points, the method comprising:
at a first network node in a first domain of the hierarchy, receiving a plurality of packets with corresponding end point identifiers individually having a stack with a first section containing a value corresponding to a higher-level domain that is above the first domain in the hierarchy and a second section containing another value corresponding to a second domain, the higher-level domain being different from the second domain;
determining a first network route from the first network node to the higher level domain by performing a comparison of the value of the first section of the end point identifiers with entries in a forwarding table in the first network node, one of the entries of the forwarding table specifying a network path from the first network node to the higher-level domain as a destination corresponding to all end points in the second domain; and forwarding the packets to a second network node in the higher-level domain based on the determined first network route; and at the second network node in the higher-level domain, removing the first section from the stack;
determining a second network route from the second network node to the end points in the second domain based on the another value in the second section of the end point identifiers; and
forwarding the packets from the second network node to the end points in the second domain based on the determined second network route.

2. The method of claim 1 wherein:
the hierarchy of domains includes a lower level domain that is lower in the hierarchy than the first domain; and
the method further includes receiving the plurality of packets from the lower level domain along a network route independently determined by a network node in the lower level domain.

3. The method of claim 1 wherein:
the hierarchy of domains includes a lower level domain that is lower in the hierarchy than the first domain; and
the method further includes receiving the plurality of packets from the lower level domain along a network route independently determined by a network node in the lower level domain based on the value of the first section of the stack.

4. The method of claim 1 wherein:
the hierarchy of domains includes a lower level domain that is lower in the hierarchy than the first domain; and
the method further includes receiving the packets from the lower level domain along a network route independently determined by a network node in the lower level domain based on a value of a third section of the stack, wherein the third section is removed from the stack before the plurality of packets are forwarded from the lower level domain to the first domain.

5. The method of claim 1 wherein:
the hierarchy of domains includes a lower level domain that is lower in the hierarchy than the second domain; and
forwarding the plurality of packets from the second network node includes:
removing the second section from the stack; and forwarding the plurality of packets with the second section removed to a network node in the lower level domain.

6. The method of claim 1 wherein:
the hierarchy of domains includes a lower level domain that is lower in the hierarchy than the second domain; and
forwarding the plurality of packets from the second network node includes:
determining a third network route from the second domain to the lower level domain based on the another value of the second section;
subsequent to determining the third network route, removing the second section from the stack; and
forwarding the plurality of packets with the second section removed to a network node in the lower level domain along the determined third network route.

7. The method of claim 1 wherein the
forwarding table in the first network node of the first domain includes entries corresponding to at least some of the end points in the first domain and the second network node in the higher-level domain.

8. The method of claim 1 wherein:
the higher-level domain includes a group of network nodes having a same forwarding state, the group of network nodes including the second network node; and
forwarding the packets includes forwarding the packets to the second network node as one of the network nodes in the group based on the determined first network route.

9. The method of claim 1 wherein:
the hierarchy of domains includes a lower level domain that is lower in the hierarchy than the second domain; and
forwarding the packet from the second network node includes:
removing the second section from the stack; and
forwarding the packet with the second section removed to a network node in the lower level domain.

10. The method of claim 1 wherein:
the hierarchy of domains includes a lower level domain that is lower in the hierarchy than the second domain; and
forwarding the packet from the second network node includes:
determining a third network route from the second domain to the lower level domain based on the second value of the second section;
subsequent to determining the third network route, removing the second section from the stack; and
forwarding the packet with the second section removed to a network node in the lower level domain along the determined third network route.

11. A method of transmitting packets in a computer network having a hierarchy of domains individually having one or more network nodes interconnected with one or more end points, the method comprising:
at each domain in the hierarchy, independently performing:
receiving a request to transmit a packet from a first end point in a domain to a second end point in the computer network, the packet having an end point identifier having a stack with a first section containing a value corresponding to a higher-level domain that is above the first domain in the hierarchy and a second section containing another value corresponding to a second domain;
determining whether the second end point is in the same domain as the first end point;
in response to determining that the second end point is not in the same domain as the first end point, determining a first network route to the higher-level domain as a destination for the packet based on the value in the first section of the stack, the higher-level domain being immediately above the domain in the hierarchy of domain and being the destination corresponding to all end points that are not in the domain;
forwarding the packets to a network node in the higher-level domain based on the determined first network route; and at the network node in the higher-level domain,
removing the first section from the stack;
determining a second network route from the network node to the second domain based on the another value in the second section of the end point identifiers; and
transmitting the packet from the first end point in the domain to second end point via the higher-level domain by forwarding the packet from the network node to the second domain based on the determined second network route.

12. The method of claim 11, wherein the method further includes, in response to determining that the second end point is in the same domain as the first end point, transmitting the packet to the second end point in the same domain without transmitting the packet to the higher-level domain.

13. The method of claim 11 wherein:
each domain in the hierarchy includes an edge node; and
the method further includes, at each domain in the hierarchy, independently performing:
receiving a packet having a corresponding end point identifier at the edge node;
determining an end point in the domain based on the end point identifier; and
forwarding the packet to the determined end point.

14. The method of claim 11 wherein:
each domain in the hierarchy includes an edge node; and
the method further includes, at each domain in the hierarchy, independently performing:
receiving a packet having a corresponding end point identifier at the edge node, the end point identifier including a plurality of sections in a stack;
removing one of the sections from a top of the stack;
subsequently, determining an end point based on a value in one of the section in the stack, the one section being on top of the stack; and
forwarding the packet to the determined end point.

15. The method of claim 11 wherein:
each domain in the hierarchy includes an edge node; and
the method further includes, at each domain in the hierarchy, independently performing:
receiving a packet having a corresponding end point identifier at the edge node, the end point identifier including a plurality of sections in a stack;
removing one of the sections from a top of the stack;
subsequently, determining an end point based on a value in one of the section in the stack, the one section being on top of the stack;
determining if the end point is in the domain; and
in response to determining that the end point is not in the domain, forwarding the packet to a lower-level domain in the hierarchy.

16. The method of claim 11 wherein:
the stack includes a plurality of sections, the individual sections corresponding to levels of hierarchy in the computer network.

17. A method of transmitting packets in a computer network having a hierarchy of domains individually having one or more network nodes interconnected with one or more end points, the method comprising:
at a first network node in a first domain of the hierarchy, receiving a packet with an end point identifier having a stack with a first section containing a first value and a second section containing a second value;
determining a first network route from the first network node to a higher level domain by performing a comparison of the first value of the first section with entries in a forwarding table in the first network node, one of the entries of the forwarding table specifying a network path from the first network node to the higher-level domain as a destination corresponding to all end points in the second domain;
forwarding the packet to a second network node in the higher-level domain based on the determined first network route; and
at the second network node in the higher-level domain, removing the first section from the stack;
determining a second network route from the second network node to the second domain based on the second value in the second section of the stack; and
forwarding the packet from the second network node to the second domain based on the determined second network route.

18. The method of claim 17 wherein:
the hierarchy of domains includes a lower level domain that is lower in the hierarchy than the first domain; and
the method further includes receiving the packet from the lower level domain along a network route independently determined by a network node in the lower level domain.

19. The method of claim 17 wherein:
the hierarchy of domains includes a lower level domain that is lower in the hierarchy than the first domain; and
the method further includes receiving the packet from the lower level domain along a network route independently determined by a network node in the lower level domain based on the first value of the first section of the stack.

20. The method of claim 17 wherein:
the hierarchy of domains includes a lower level domain that is lower in the hierarchy than the first domain; and
the method further includes receiving the packets from the lower level domain along a network route independently determined by a network node in the lower level domain based on a third value of a third section of the stack, wherein the third section is removed from the stack before the packet is forwarded from the lower level domain to the first domain.

\* \* \* \* \*